Patented Dec. 26, 1933

1,941,351

UNITED STATES PATENT OFFICE 1,941,351

PECTOSE RESINS AND METHOD OF MAKING SAME

Adolf Hawerlander, St. Joseph, Mo., assignor to Albert D. Stewart, St. Joseph, Mo.; Hazel Stewart administratrix of said Albert D. Stewart, deceased No Drawing. Application May 31, 1932
Serial No. 614,635

14 Claims. (Cl. 260—3)

This invention relates to the manufacture of a novel resin, and in particular to the manufacture of a resin from pectous substances and to the resin itself as a new article of commerce.

In its broad concept, the invention is applicable to the treatment of pectous substances or pectose, a matter soluble in one percent NaOH solution at 100° C., and generally grouped together with the fat and wax constituents of vegetable fibrous material, and in one specific aspect, the invention is directed to the utilization of the non-fibrous, pectous substances from cereal straw, such as oats, barley, rye, rice, and more particularly wheat straw.

It has been heretofore proposed (see "Chemicals of Pulp and Paper Making", by Sutermeister, published in 1920 by John Wiley & Sons) to produce this non-fibrous pectous material from wheat straw, and the pectous material has been described, after the evaporation of the cooking liquid or condensation steam, to consists of a heavy viscous dark brown residue, which in the following description shall be referred to as the unreacted non-fibrous residue.

It is to be understood that this unreacted residue is a complex compound and that many impurities, including microscopic small fibre particles or bodies of fibrous nature are present; in other words, that the pectose is in an analytically impure state and that the purity and clarity of the final resulting pectose resin will be identical to the chemically pure state of the pectose to be processed.

It is an object of the present invention to process this unreacted residue to produce a variety of products of commercial value. By proper regulation of the process, it is possible to produce a clear, transparent, amber-color resin which is of great stability and which is fusible, meltable and soluble.

It is another object of the invention to process pectose, a matter soluble in one percent NaOH solution at 100° C. regardless of its origin and its derivation or substitution to produce a pectose resin.

Briefly the present invention comprises reacting the unreacted non-fibrous residue of pectous substances in the presence of an aldehyde and in the presence of a ketone, using an alkali as a condensing agent. Formaldehyde being the most active of the aldehyde group may constitute the preferred aldehyde. Acetone being the cheapest and most common of the ketones group, may be utilized as the ketone, but it is to be understood of course, that it is within the contemplation of the invention to include the cyclo-hexanone and related cyclic ketones and ketenes.

The resin produced by the present invention has a great many of the characteristics of phenol formaldehyde resins, and the application of the resins of the present invention in further utilization is similar in some respects to phenol formaldehyde resins. For instance, resins produced by the present invention, which for identification, shall be referred to hereinafter as pectose resins, are soluble in most any solvent usually used for dissolving phenol resins, particularly if the solvent is in hot condition. The pectose resins of the present invention melt readily at temperatures around 70° C., and soon after the melted resins are exposed to atmospheric conditions they return to their previous state, meaning that the mass again forms into brittle, stable resins without losing its characteristics of further solubility or meltability.

The boiling point of pectose resins produced by the present invention is around 170° C. The pectose resins of the present invention can be applied in the same manner for varnish and lacquer manufacture as phenol resins; their hardening or transformation into insoluble, infusible, resins is almost identical with the resins of the phenol group.

The unreacted non-fibrous pectous residue is preferably used in neutralized condition, but it is to be understood that it is not essential that it be neutralized. I have found that the residue wherein the fat, wax and pectous substances are grouped together, may be neutralized by approximately 0.32% of NaOH on the raw material for each 1% found on analysis.

One of the features of the invention which should be noted is that in the course of processing the fat and wax associated with the pectose will eventually settle off and can easily be separated from the remaining mass before this mass finally turns into the pectose resin.

In order to clearly describe my invention, I now will give an example of one way of processing the neutralized, unreacted residue, it of course, being understood that other methods, procedures, as well as, variations in the amounts of employed chemicals, derivatives of these chemicals as well as substitutes for them, will be within the scope of my invention; also, I do not want to bind myself to any limit of time for the full processing nor to the exact temperatures to be mentioned,

Example 100 gallons neutralized, unreacted residue
100 gallons formaldehyde 36–40% strength
100 gallons dimethyl ketone are mixed together—the liquids under stirring brought to about 35° C. This temperature of 35° C. is kept for about 6 hours by adding caustic potash to the liquid while the mass is kept in agitation. The liquid mass is now set aside and will settle within a few hours into three layers; the top layer containing the fat and wax previously associated with the pectose and a bottom layer being more in the nature of a residue, intermixed with fibrous particles and foreign matters of not yet determined nature; the top and the bottom layers are separated from the middle portion or the portion in between these two layers—the latter one constituting about 85% of the total liquid mass, and of dark yellow color. This middle layer is then drawn off and caustic potash is added thereto in sufficient amount to produce a violent reaction capable of separating the liquid mass again into two layers, the bottom layer being of a gummy, tacky, slimy consistency constituting about 65% of the total liquid. Repeatedly neutralizing with a slight nitric acid solution, preferably in hot condition and following washing in warm water, solidifies this gummy, slimy mass and after evaporation, eventually under reflux, a clear amber-like resin appears.

This mass can be broken up to reduce the resin to lump form, or the mass can be heated and the melted resin poured over glass or polished steel plates to form resin flakes, or the resin mass can be ground for use in powder form, or the resinous mass after neutralization and washing, can be worked, the resin at that stage being soft and pliable.

A large number of ketones and ketenes are available and suitable for the purpose of my invention, such as for instance, acetone, mesityl oxide, anthraquinone, etc., also the cyclohexanone and related cyclic ketones and ketenes are included.

It is to be understood of course, that the proportions specified in the illustrative example, may be widely varied depending on the characteristics of the resin which it is desired to produce, and the particular ketone or ketene which is employed.

I am aware that ketone resins have been produced by reaction between formaldehyde and acetone or their derivatives with alkali, but the resulting product is of quite a different nature from the pectose resins of the present invention. One of the distinguishing characteristics is that the ketone resins of the prior art are permanently fusible and soluble.

To convert the pectose resins of the present invention to infusible and insoluble state, a hardening agent such as hexamethylenetetramine may be combined with the pectose resin and the mixture subjected to sufficient heat to bring about said conversion.

I claim as my invention:

1. A process of manufacturing pectose resins comprising reacting pectose, an aldehyde and a ketone in the presence of an alkali.

2. A process of manufacturing pectose resins comprising reacting pectose, acetone and formaldehyde in the presence of sodium hydroxide.

3. A process of manufacturing pectose resins, which comprises reacting pectose, an aldehyde and a ketone in the presence of an alkali whereby to produce a composition which separates into a plurality of layers, separating the layer containing the fat and wax originally associated with the pectose and the layer containing impurities, reacting the remaining layer with an alkali whereby to produce a reaction and a composition which separates into two layers, separating the gummy, tacky layer, neutralizing this latter layer with an acid solution, washing out the neutralized gummy mass and resinifying by evaporation.

4. A process of manufacturing pectose resins, which comprises reacting the non-fibrous unreacted pectous residue derived from vegetable fibrous material containing pectose, an aldehyde and a ketone in the presence of an alkali.

5. A process of manufacturing pectose resins, which comprises neutralizing non-fibrous unreacted pectous residue from vegetable fibrous material containing pectose, and reacting this neutralized unreacted residue with an aldehyde and a ketone in the presence of an alkali.

6. A process of manufacturing pectose resins comprising reacting non-fibrous unreacted pectous residue derived from wheat straw with an aldehyde and a ketone in the presence of an alkali.

7. A process of manufacturing pectose resins, which comprises neutralizing unreacted non-fibrous pectous residue derived from wheat straw, reacting this neutralized residue with formaldehyde and acetone in the presence of sodium hydroxide, separating the reacted mass from the layer containing fat and wax and the layer containing impurities, reacting the separated layer of the mass with sodium hydroxide, separating the gummy, tacky layer, neutralizing the latter layer with a low acid solution, washing the mass and resinifying same by evaporation.

8. A pectose resin consisting of the reaction product from pectose, an aldehyde and a ketone with an alkali.

9. A pectose resin consisting of the reaction product from the non-fibrous pectous residue separated from wheat straw, an aldehyde and a ketone with an alkali.

10. A resin derived from the reaction of pectose with an aldehyde in the presence of a ketone and an alkali, characterized by solubility and fusibility.

11. A resin derived from the reaction of pectose with an aldehyde in the presence of a ketone and an alkali, characterized by solubility and fusibility and having a boiling point of approximately 170° C.

12. A resin derived from the reaction of pectose with an aldehyde in the presence of a ketone and an alkali, characterized by solubility and fusibility, capable of transformation into infusible, insoluble state under the influence of heat and the addition of a hardening agent.

13. An amorphous condensation product derived from the reaction of pectose with an aldehyde and a ketone in the presence of alkali, characterized by solubility and fusibility.

14. An amorphous condensation product derived from the reaction of pectose with an aldehyde and a ketone in the presence of alkali, characterized by solubility and fusibility and capable of transformation into insoluble, infusible state under the influence of heat and the addition of a hardening agent.

ADOLF HAWERLANDER.